(12) United States Patent
Spryshak

(10) Patent No.: US 10,576,804 B2
(45) Date of Patent: Mar. 3, 2020

(54) HVAC MODULE

(71) Applicant: Valeo Climate Control Corp., Auburn Hills, MI (US)

(72) Inventor: Joseph Spryshak, Hartland, MI (US)

(73) Assignee: Valeo Climate Control Corp., Auburn Hills, MI (US)

( * ) Notice: Subject to any disclaimer, the term of this patent is extended or adjusted under 35 U.S.C. 154(b) by 0 days.

(21) Appl. No.: 15/136,910

(22) Filed: Apr. 23, 2016

(65) Prior Publication Data

US 2017/0305233 A1    Oct. 26, 2017

(51) Int. Cl.
*B60H 1/00* (2006.01)

(52) U.S. Cl.
CPC .............. *B60H 1/00064* (2013.01); *B60H 2001/00092* (2013.01)

(58) Field of Classification Search
CPC ........... B60H 1/00685; B60H 1/00064; B60H 1/00842; B60H 1/12; B60H 1/00678; B60H 1/00835
USPC .......................................................... 165/42
See application file for complete search history.

(56) References Cited

U.S. PATENT DOCUMENTS

| | | | | |
|---|---|---|---|---|
| 4,383,642 A * | 5/1983 | Sumikawa | .......... | B60H 1/00064 165/42 |
| 5,797,585 A * | 8/1998 | Auvity | .................. | F16K 31/521 251/80 |
| 5,862,677 A * | 1/1999 | Kim | .................... | B60H 1/00064 165/42 |
| 6,247,530 B1 * | 6/2001 | Mochizuki | ......... | B60H 1/00064 165/203 |
| 6,568,468 B1 * | 5/2003 | Uemura | ............. | B60H 1/00064 165/103 |
| 6,578,771 B2 * | 6/2003 | Kaneura | ............ | B60H 1/00064 165/42 |
| 6,640,571 B2 * | 11/2003 | Matsunaga | ........ | B60H 1/00028 165/42 |
| 6,640,890 B1 * | 11/2003 | Dage | .................. | B60H 1/00821 165/203 |
| 6,886,350 B2 | 5/2005 | Petesch et al. | | |
| 6,904,763 B2 * | 6/2005 | Araki | .................. | B60H 1/00028 165/42 |
| 7,013,967 B2 * | 3/2006 | Kondo | ............... | B60H 1/00064 165/203 |

(Continued)

*Primary Examiner* — Tho V Duong
*Assistant Examiner* — Raheena R Malik
(74) *Attorney, Agent, or Firm* — Dierker & Kavanaugh, P.C.

(57) ABSTRACT

An HVAC module for a vehicle includes an upper airflow from an evaporator having an upper hot branch through a heater core and an upper cold branch that bypasses the heater core. A lower airflow from the evaporator has a lower hot branch through the heater core and a lower cold branch that bypasses the heater core. An upper barrel door is to select an upper blend setting of the upper airflow directed through the upper hot branch and through the upper cold branch. A lower barrel door is to select a lower blend setting of the lower airflow directed through the lower hot branch and through the lower cold branch. The upper hot branch and the lower hot branch are connected to a rear duct connected to an upper blend zone. The upper cold branch feeds the upper blend zone. The lower cold branch feeds the rear duct.

13 Claims, 14 Drawing Sheets

(56) References Cited

U.S. PATENT DOCUMENTS

| | | | |
|---|---|---|---|
| 7,096,924 B2* | 8/2006 | Araki | B62D 25/14 165/41 |
| 7,416,138 B2 | 8/2008 | Ellison et al. | |
| 7,503,383 B2* | 3/2009 | Yamaguchi | B60H 1/00021 165/122 |
| 8,939,822 B2 | 1/2015 | Kakizaki et al. | |
| 2001/0001417 A1* | 5/2001 | Beck | B60H 1/00064 165/203 |
| 2003/0037918 A1* | 2/2003 | Lee | B60H 1/00064 165/202 |
| 2003/0094262 A1* | 5/2003 | Kondo | B60H 1/00064 165/42 |
| 2003/0205370 A1* | 11/2003 | Kim | B60H 1/00064 165/204 |
| 2004/0093885 A1* | 5/2004 | Ito | B60H 1/00028 62/244 |
| 2005/0118944 A1* | 6/2005 | Vincent | B60H 1/00064 454/121 |
| 2007/0044950 A1* | 3/2007 | Halder | B60H 1/00064 165/202 |
| 2009/0165991 A1* | 7/2009 | Komaba | B60H 1/00028 165/42 |
| 2010/0304654 A1* | 12/2010 | Kakizaki | B60H 1/00064 454/121 |
| 2016/0221412 A1* | 8/2016 | Loup | B60H 1/00064 |

* cited by examiner

HVAC MODULE

BACKGROUND

HVAC (Heating Ventilation and Air Conditioning) systems are used for climate control of, e.g., internal cabin areas of an automobile. HVAC systems may be configured with an HVAC unit having a heat exchanger disposed in a housing. An HVAC distribution system may be operatively connected to the HVAC unit. An HVAC system may have one or more airflow paths for allowing air to flow, for example, to, from, and/or within the HVAC unit and the HVAC distribution system. Doors may be associated with the airflow path for controlling the amount of air flowing to, through, and/or from the HVAC unit and/or the HVAC distribution system.

SUMMARY

An HVAC module for a vehicle includes an upper airflow from an evaporator having an upper hot branch through a heater core and an upper cold branch that bypasses the heater core. A lower airflow from the evaporator has a lower hot branch through the heater core and a lower cold branch that bypasses the heater core. An upper barrel door is to select an upper blend setting of the upper airflow directed through the upper hot branch and through the upper cold branch. A lower barrel door is to select a lower blend setting of the lower airflow directed through the lower hot branch and through the lower cold branch. The upper hot branch and the lower hot branch are connected to a rear duct connected to an upper blend zone. The upper cold branch feeds the upper blend zone. The lower cold branch feeds the rear duct.

BRIEF DESCRIPTION OF THE DRAWINGS

Features of examples of the present disclosure will become apparent by reference to the following detailed description and drawings, in which like reference numerals correspond to the same or similar, though perhaps not identical, components. For the sake of brevity, reference numerals or features having a previously described function may or may not be described in connection with other drawings in which they appear.

DETAILED DESCRIPTION

The HVAC module 14 of the present disclosure includes a housing, a blower 25, an evaporator 26, and a heater core 28 located downstream of the evaporator 26. The evaporator 26 is to provide cold air and the heater core 28 is to provide hot air. These components are typical components for an HVAC module 14 and operate similarly to the components in a conventional HVAC system. Thus, the operation of the blower 25, evaporator 26, and heater core 28 will not be explained in further detail. In some of the drawings of the present disclosure, cold air flowing from the evaporator 26 is represented by arrows designated with the letter "C". Hot air flowing from the heater core 28 is represented by arrows designated with the letter "H". The mixture of hot and cold air is represented by arrows designated with the letter "M". Further, any reference to "volume of air" or "airflow" in the specification does not specifically refer to cold air, hot air or mixed air but rather is just a generic term used for simplicity.

Figure 1:
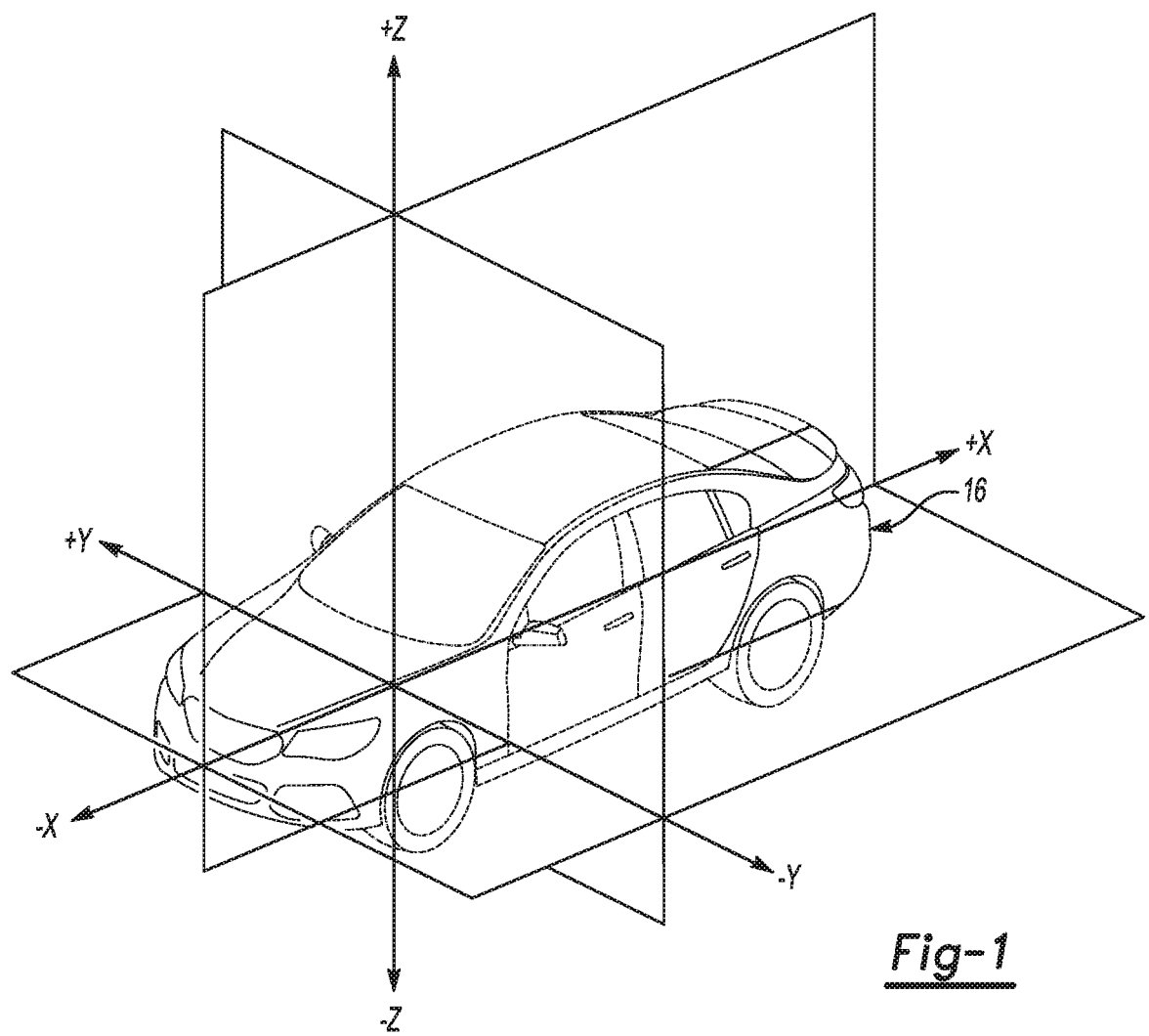
FIG. 1 is a coordinate system diagram depicting an example of vehicle space.

As used herein, "left" means in the negative "Y" direction as depicted in FIG. 1. FIG. 1 depicts a similar coordinate system to the coordinate system depicted in SAE J182, "Motor Vehicle Fiducial Marks and Three-dimensional Reference System", reaffirmed April 2005, FIG. 1. Using the same coordinate system, "right" means in the positive "Y" direction as depicted in FIG. 1. "Forward" means in the negative "X" direction as depicted in FIG. 1; and "aft" or "rearward" means in the positive "X" direction as depicted in FIG. 1. As used herein, "behind" means "aft of". In some of the Figures of the present disclosure, e.g. FIG. 3A, "forward" is indicated by an arrow with reference numeral 55. "Up", "upper" and similar terms mean in the positive "Z" direction as depicted in FIG. 1; and "down", "lower", and similar terms mean in the negative "Z" direction as depicted in FIG. 1.

Vehicles generally have a limited amount of interior space. The space is allocated to passengers and various systems in the vehicle. As content is added for the convenience and comfort of vehicle passengers, efficiency in the use of space becomes more important.

Figure 2:
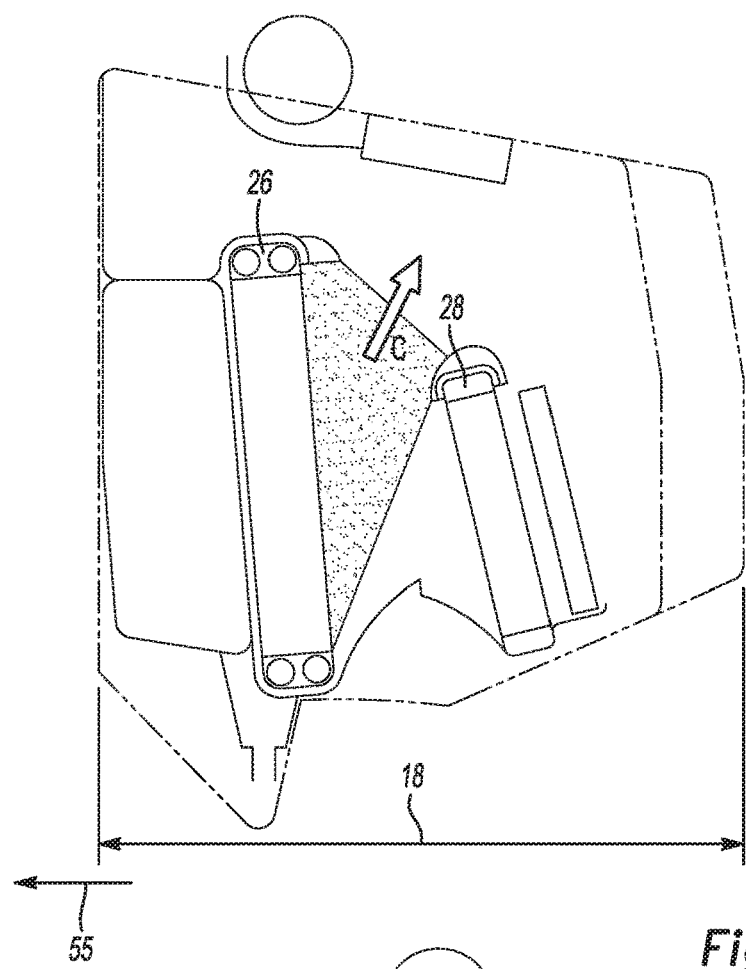
FIG. 2 is a semi-schematic cross-section view of an existing HVAC module in a full cold mode.
Figure 3B:
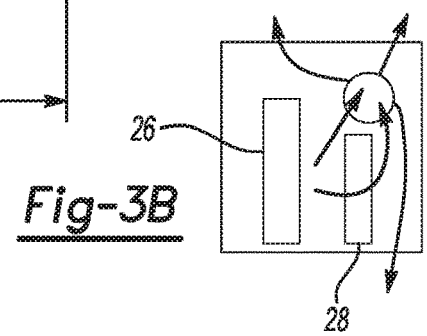
FIG. 3B is a schematic cross-section view of the existing HVAC module depicted in FIG. 3A.
Figure 3A:
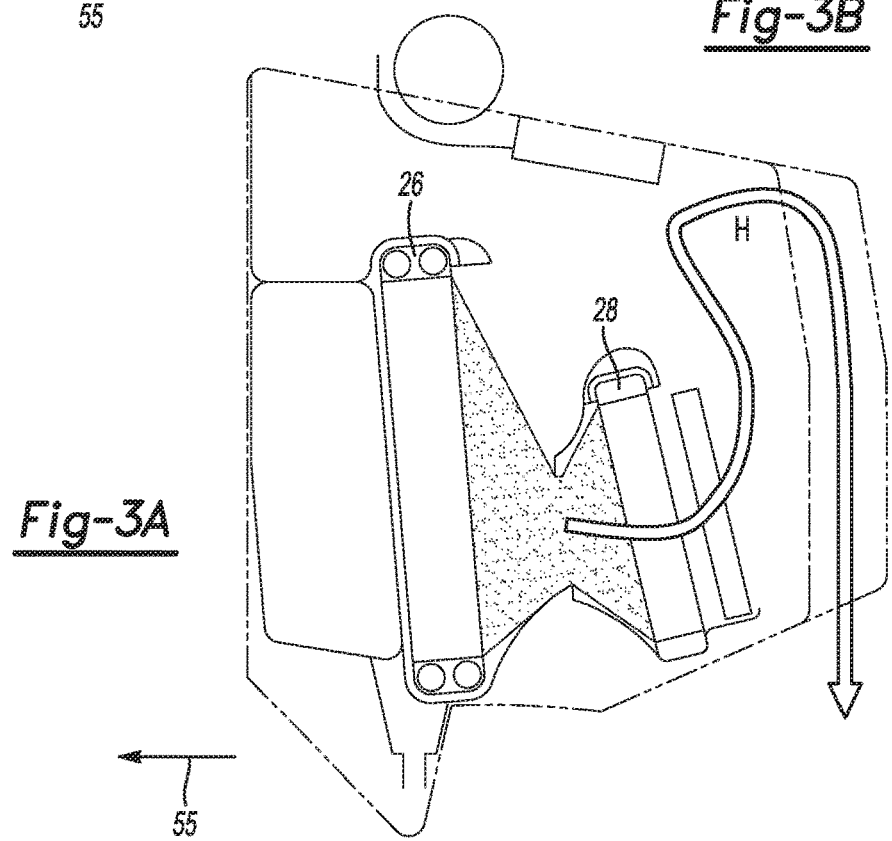
FIG. 3A is a semi-schematic cross-section view of an existing HVAC module in a full hot mode.

FIG. 2 is a semi-schematic cross-section view of an existing HVAC module in a full cold mode. FIG. 3A is a semi-schematic cross-section view of an existing HVAC module in a full hot mode. FIG. 3B is a schematic cross-section view of the existing HVAC module depicted in FIG. 3A. Some vehicles have an evaporator 26, heater core 28 and outlets as shown in FIGS. 2, 3A and 3B. Reduction in the fore-aft dimension 18 of the HVAC module shown in FIGS. 2, 3A and 3B is desirable. Some HVAC modules have improved (reduced) the fore-aft dimension by creative use of doors that occupy relatively less space. A packaging inefficiency present in some existing HVAC modules is that the air path downstream of the heater core 28 is utilized for hot air only. When full cold air is requested, the air path after the heater core 28 is not utilized as shown in FIG. 2.

Figure 11:
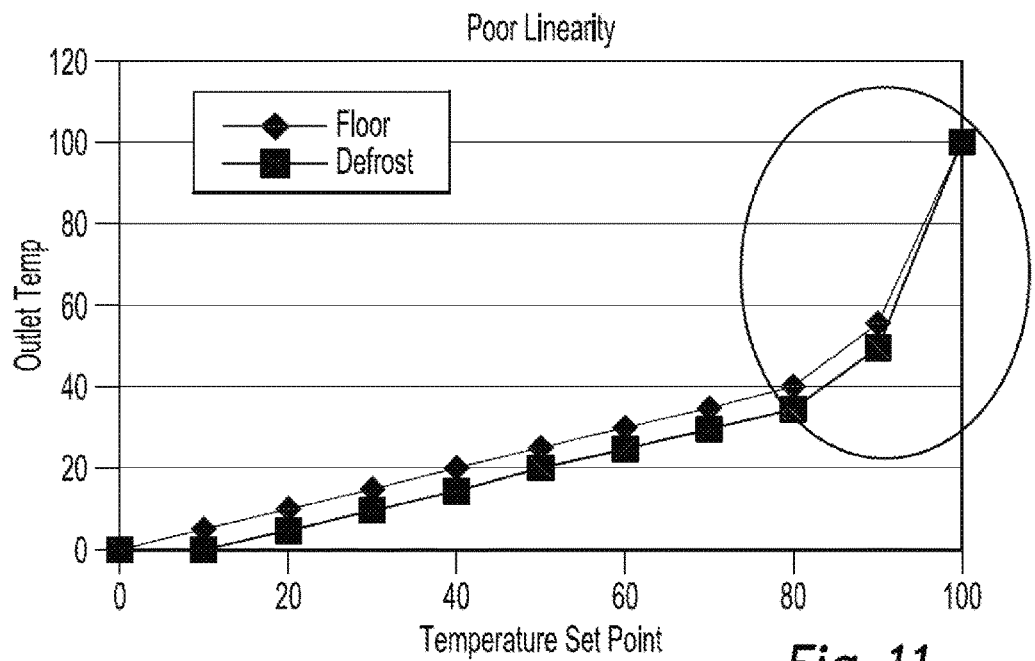
FIG. 11 is a graph depicting outlet temperature vs. temperature setpoint setting for an HVAC module with relatively poor linearity.

There are several types of door currently used for the blend function in HVAC modules. A flag door has a single leaf that rotates about an axis at an edge of the leaf. A butterfly door has two leaves that rotate about a common axis between the two leaves. A barrel door has an outer surface in the shape of a 'slice' of a hollow cylinder closed on both ends. The barrel door rotates about an axis at the center of the hollow cylinder. When barrel doors are used in a blend function, it can be difficult to control the volume of cold air passing the barrel door when the desired amount of cold is small. In some existing HVAC modules, too much cold air passes at the 90% hot blend position and the resulting temperature is much colder than the desired temperature. FIG. 11 illustrates this point.

The present disclosure overcomes disadvantages of using barrel type doors for blend. According to the present disclosure, barrel type doors offer packaging advantages over flag doors and butterfly doors. Barrel doors provide better control than flag doors. Butterfly doors can be considered disadvantageous because they control one opening, whereas barrel type doors can control more than one opening per door. Since barrel doors may have twice the seal perimeter of flag doors and butterfly doors, existing applications of barrel doors may not exhibit linear control of flow, particularly in temperature blend applications where there is unbalanced air restriction in the two downstream paths.

The HVAC module 14 of the present disclosure overcomes packaging disadvantages associated with barrel blend doors. The inventors of the present disclosure have unexpectedly and fortuitously discovered an arrangement of barrel blend doors that advantageously provides linear control of flow and temperature in an HVAC module 14. In addition, the HVAC module 14 disclosed herein has an advantageously reduced fore-aft dimension. By providing a way for cool air to flow under the heater core, examples of the HVAC module 14 of the present disclosure allow more of the HVAC volume to be applied in both hot and cold modes.

Figure 4:
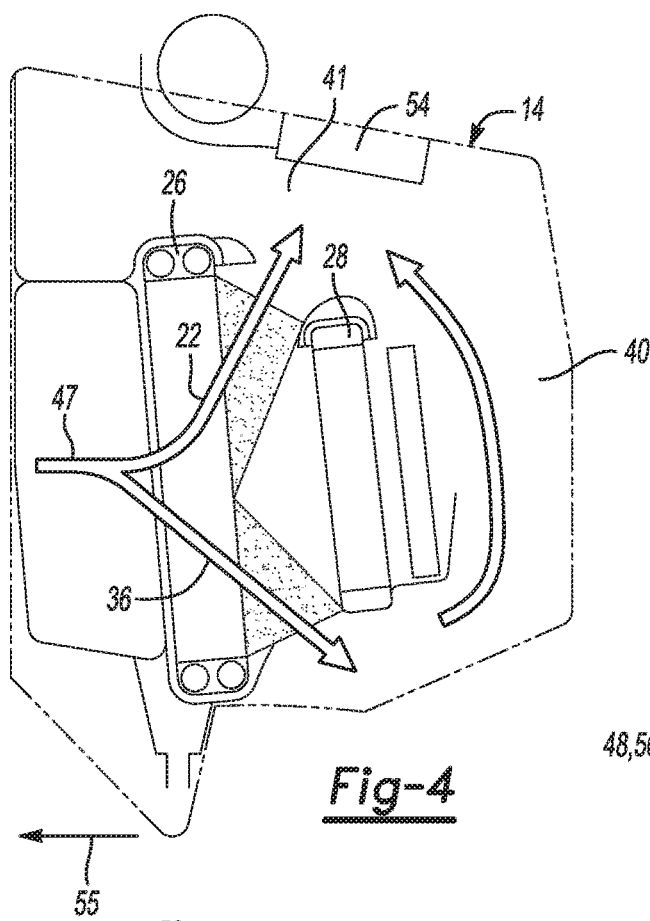
FIG. 4 is a semi-schematic cross-section view of an example of an HVAC module of the present disclosure in a full cold mode.

FIG. 4 is a semi-schematic cross-section view of an example of an HVAC module 14 of the present disclosure in a full cold mode. The total airflow 47 flows through the evaporator 26 and splits into an upper airflow 22 and a lower airflow 36. In an example, the upper airflow 22 may be about 65 percent of a total airflow 47 through the evaporator 26. In the same example, the lower airflow 36 may be about 35 percent of the total airflow 47 through the evaporator 26. The lower airflow 36 flows under the heater core 28 and behind the heater core 28 through the rear duct 40 to mix with the upper airflow 22 in the upper blend zone 41. Forward direction arrow 55 is included in FIG. 4 to indicate a direction toward the front of the vehicle 16. In the present disclosure, the rear duct 40 is a duct that is in the HVAC module 14, and is located at the rear of the HVAC module 14 to feed the upper blend zone 41 as illustrated in e.g. FIG. 4, FIG. 6 and FIG. 7. The rear duct 40 is not to be confused with a duct that feeds the second row of seating in the passenger compartment of the vehicle, e.g. second row vent duct 48 (see FIG. 6 and FIG. 7).

It is to be understood that rather than flowing under the heater core 28, the lower airflow 36 may bypass the heater core 28 by flowing to the left or to the right of the heater core 28 and then behind the heater core 28 through the rear duct 40 to mix with the upper airflow 22 in the upper blend zone 41.

Figure 5B:
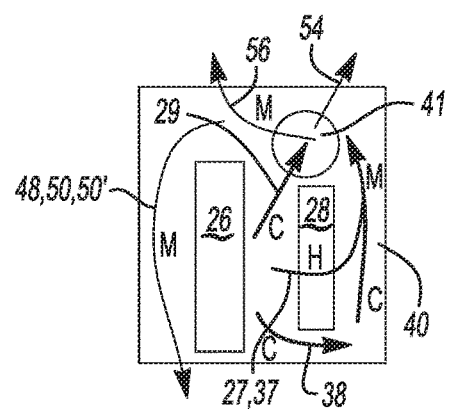
FIG. 5B is a schematic cross-section view of the example of the HVAC module depicted in FIG. 4 in a blend mode.
Figure 5A:
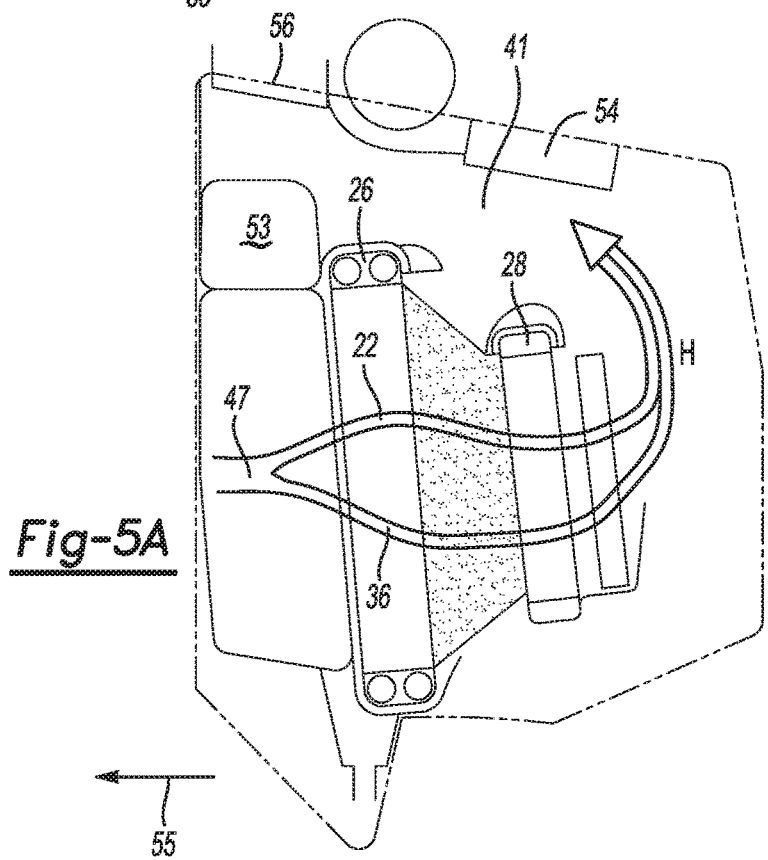
FIG. 5A is a semi-schematic cross-section view of the example of the HVAC module depicted in FIG. 4 in a full hot mode.

FIG. 5A is a semi-schematic cross-section view of the example of the HVAC module 14 depicted in FIG. 4 in a full hot mode. The total airflow 47 flows through the evaporator 26. The upper airflow 22 and the lower airflow 36 both flow through the heater core 28 and behind the heater core 28. A portion of the heated air may be directed upwardly through the upper blend zone 41 to, for example, a vent outlet 54 and another portion may be directed through the first row floor outlet 53. Forward direction arrow 55 is included in FIG. 5A to indicate a direction toward the front of the vehicle 16.

FIG. 5B is a schematic cross-section view of the example of the HVAC module 14 depicted in FIG. 4 in a blend mode. An upper cold branch 29 flows from the evaporator 26 to the upper blend zone 41. A lower cold branch 38 flows from the evaporator 26 under the heater core 28 through the rear duct 40 behind of the heater core 28 to the upper blend zone 41. A combined upper hot branch 27 and lower hot branch 37 flows from the evaporator 26 through the heater core 28 then through the rear duct 40 behind the heater core 28 to the upper blend zone 41. All of the flows are combined in the upper blend zone 41 to feed the defrost outlet 56, the first row vent 54, and the second row ducts 48, 50, 50'.

Figure 6:
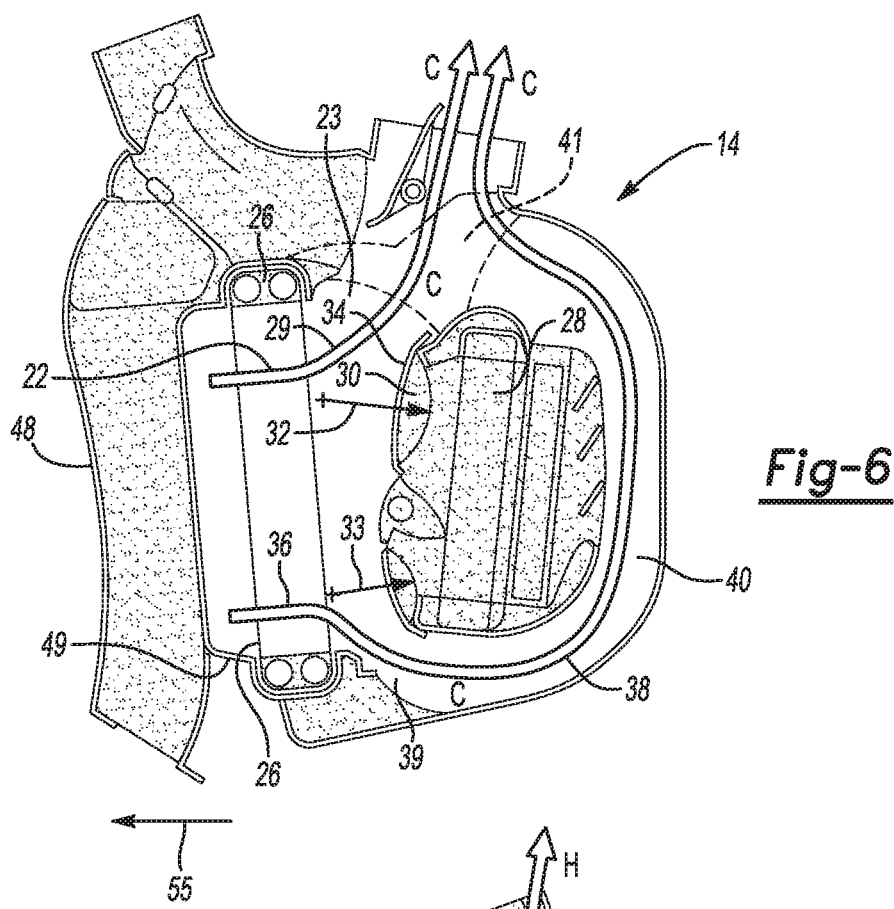
FIG. 6 is a semi-schematic cross-section view of an example of an HVAC module of the present disclosure in a full cold mode.
Figure 7:
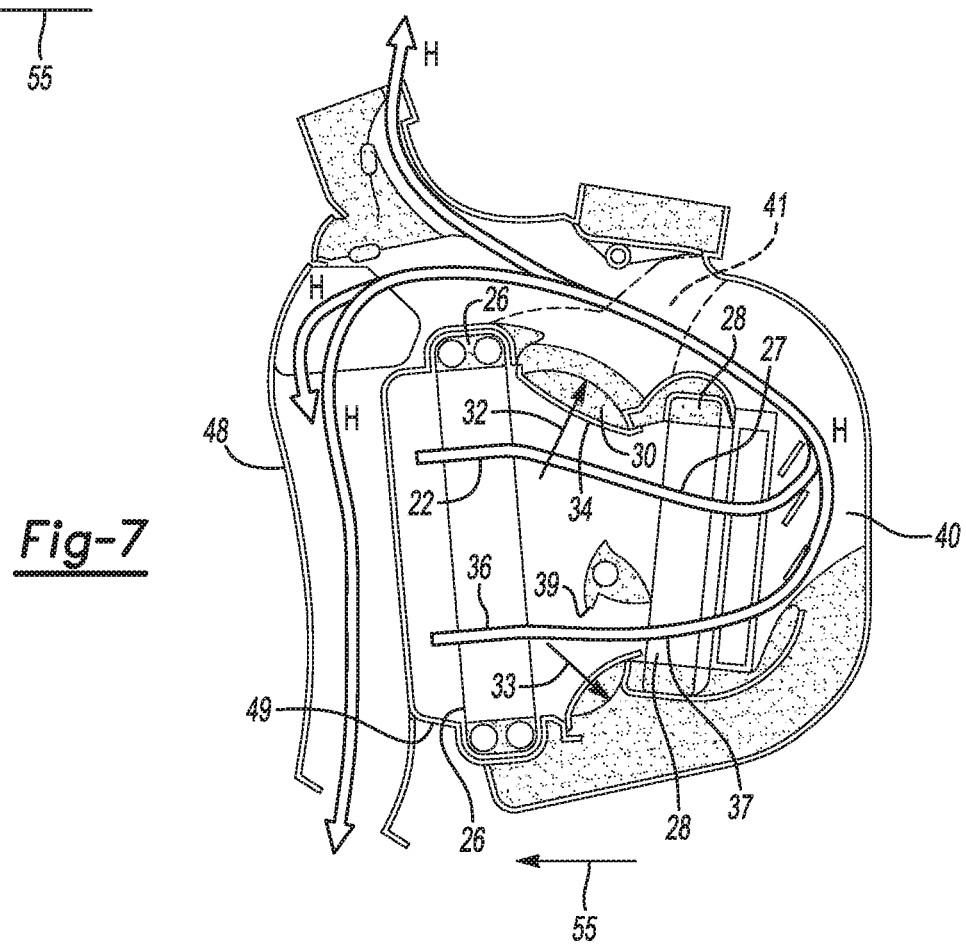
FIG. 7 is a semi-schematic cross-section view of the example of the HVAC module depicted in FIG. 6 in full hot mode.

FIG. 6 is a semi-schematic cross-section view of an example of an HVAC module 14 of the present disclosure in a full cold mode. FIG. 7 is a semi-schematic cross-section view of the example of the HVAC module 14 depicted in FIG. 6 in full hot mode. According to the present disclosure, an example of an HVAC module 14 for a vehicle 16 includes an upper airflow 22 from an evaporator 26 having an upper hot branch 27 through a heater core 28 (See FIG. 7.) and an upper cold branch 29 that bypasses the heater core 28 (See FIG. 6). It is to be understood that rather than flowing over the heater core 28 as shown in FIG. 6, the upper cold branch 29 may bypass the heater core 28 by flowing to the left or to the right of the heater core 28 and then to the upper blend zone 41.

A lower airflow 36 from the evaporator 26 has a lower hot branch 37 through the heater core 28 (see, FIG. 7) and a lower cold branch 38 that bypasses the heater core 28 (see FIG. 6). In the example depicted in FIG. 6, the lower cold branch 38 passes under the heater core 28. In other examples, the upper cold branch 29 and the lower cold branch 38 may bypass the heater core 28 on opposite sides of the heater core 28. An upper barrel door 30 is to select an upper blend setting 34 of the upper airflow 22 directed through the upper hot branch 27 and the upper airflow 22 directed through the upper cold branch 29. The upper blend setting 34 is the position of the upper barrel door 30 relative to the housing. (See, e.g., FIGS. 8A-8K.) A lower barrel door 31 is to select a lower blend setting 35 (see, e.g., FIGS. 8A-8K) of the lower airflow 36 directed through the lower hot branch 37 and the lower airflow 36 directed through the lower cold branch 38. The upper hot branch 27 and the lower hot branch 37 are connected to a rear duct 40 connected to an upper blend zone 41 (see, e.g., FIG. 6). The upper cold branch 29 feeds into the upper blend zone 41. The lower cold branch 38 feeds into the rear duct 40 which is connected to the upper blend zone 41 to feed the upper blend zone 41.

In the examples of the present disclosure, an upper airflow path 23 for the upper airflow 22 may be less restrictive than a lower airflow path 39 for the lower airflow 36. As depicted in FIG. 6, the upper airflow path 23 includes the entire path that the upper airflow 22 takes within the HVAC module. As depicted in FIG. 6, the upper barrel door 30 is larger than the lower barrel door 31 because the upper barrel door 30 and the lower barrel door 31 are appropriately sized to accommodate as much airflow as the upper airflow path 23 and the lower airflow path 39 can handle. In other words, when fully open, the upper barrel door 30 does not significantly contribute to the restriction of the upper airflow path 23; yet the upper barrel door 30 is also not significantly oversized. An oversized door is an inefficient user of space. Similarly, when fully open, the lower barrel door 31 does not significantly contribute to the restriction of the lower airflow path 39; yet the lower barrel door 31 is also not significantly oversized. In examples of the present disclosure, a first barrel radius 32 of the upper barrel door 30 may be larger than a second barrel radius 33 of the lower barrel door 31. Therefore, the relative size of the barrel door 30, 31 is an indication of the relative restriction in the upper airflow path 23 and the lower airflow path 39. In another example, the lower barrel door 31 may be smaller than the upper barrel door 30 if the lower barrel door 31 is narrower (e.g. in the Y direction) than the upper barrel door 30 and the first barrel radius 32 of the upper barrel door 30 may be the same as the second barrel radius 33 of the lower barrel door 31.

In examples of the present disclosure, the HVAC module 14 may have a temperature setpoint 42 with a range of settings from 0 percent module heat to 100 percent module heat. In FIGS. 8A-8K, the temperature setpoint 42 is represented by a dial. The dial may represent a knob on the instrument control cluster of a vehicle 16. When full heat is desired, the knob is turned to the 100 percent module heat setting. In some vehicles, the knob is turned fully to the "red" side. When full cold is desired, the knob is turned to the 0 percent module heat setting. In some vehicles, the knob is turned fully to the "blue" side for full cold. In other vehicles, an automatic climate control system may control the temperature setpoint 42.

In an example of the present disclosure, the upper blend setting 34 ranges from 100 percent upper cold (FIG. 8K) to 100 percent upper hot (FIG. 8A). 100 percent upper cold (FIG. 8K) corresponds to 100 percent of the upper airflow 22 flowing in the upper cold branch 29 and zero percent of the upper airflow 22 flowing in the upper hot branch 27. 100 percent upper hot (FIG. 8A) corresponds to zero percent of the upper airflow 22 flowing in the upper cold branch 29 and 100 percent of the upper airflow 22 flowing in the upper hot branch 27. 100 percent of the upper airflow 22 is divided between the upper cold branch 29 and the upper hot branch 27 by the upper barrel door 30. The lower blend setting 35 ranges from 100 percent lower cold (FIG. 8K) to 100 percent lower hot (FIG. 8A). 100 percent lower cold (FIG. 8K) corresponds to 100 percent of the lower airflow 36 flowing in the lower cold branch 38 and zero percent of the lower airflow 36 flowing in the lower hot branch 37. 100 percent lower hot (FIG. 8A) corresponds to zero percent of the lower airflow 36 flowing in the lower cold branch 38 and 100 percent of the lower airflow 36 flowing in the lower hot branch 37. 100 percent of the lower airflow 36 is divided between the lower cold branch 38 and the lower hot branch 37 by the lower barrel door 31.

Figure 8A:
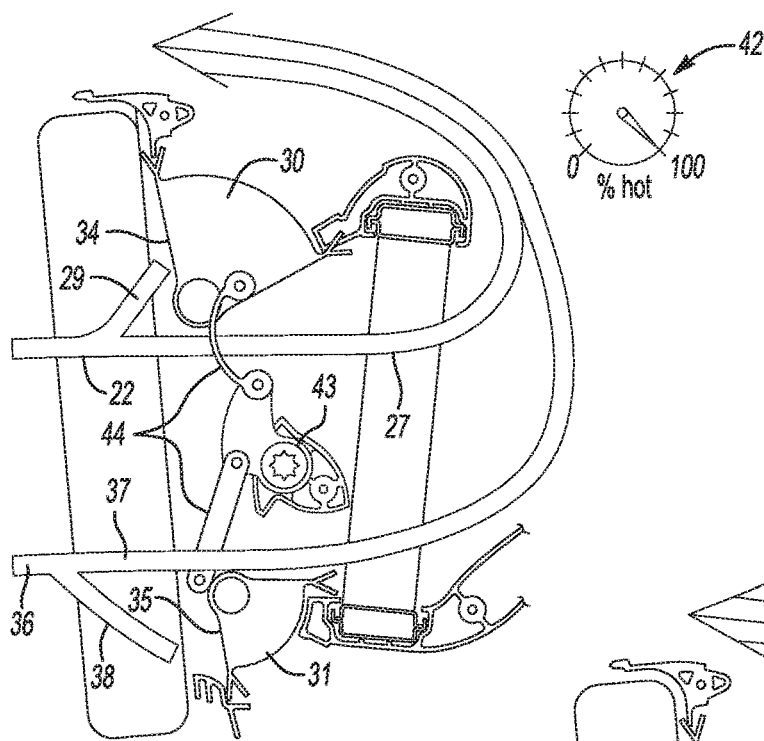
FIGS. 8A-8K are semi-schematic cross-section views of an example of an HVAC module of the present disclosure with each view having a different temperature setpoint.
Figure 8B:
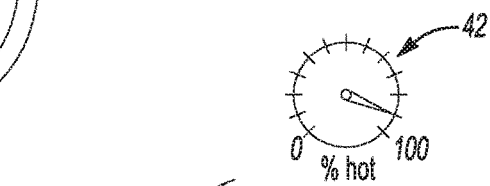
Figure 8B:
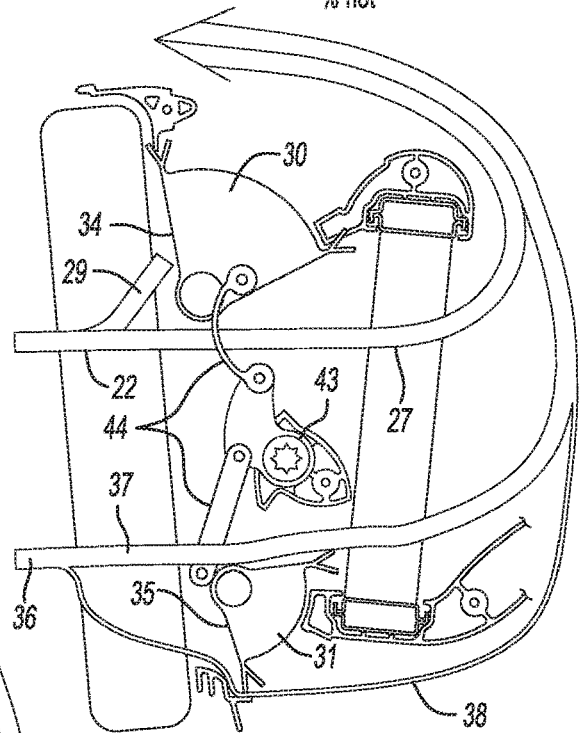
Figure 8C:
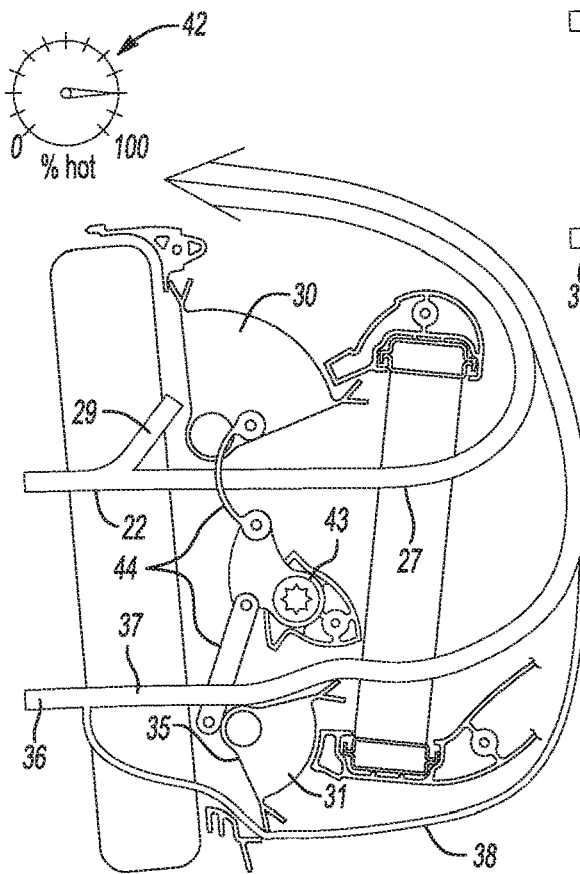
Figure 8D:
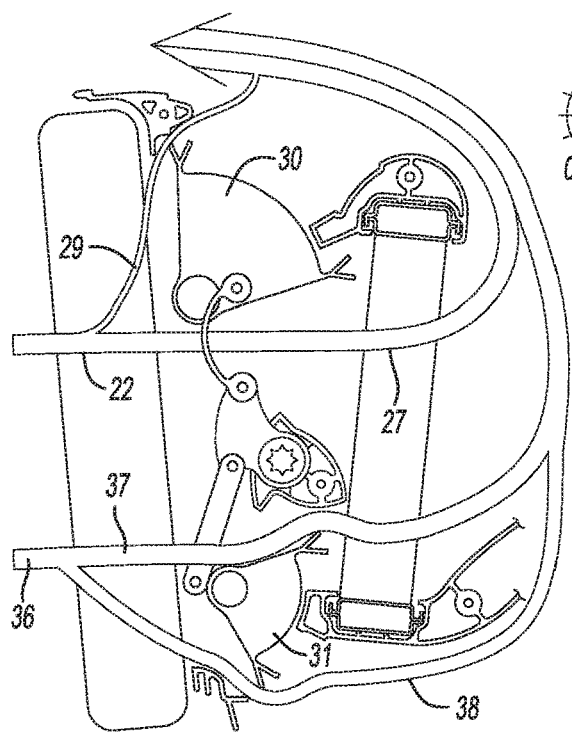
Figure 8E:
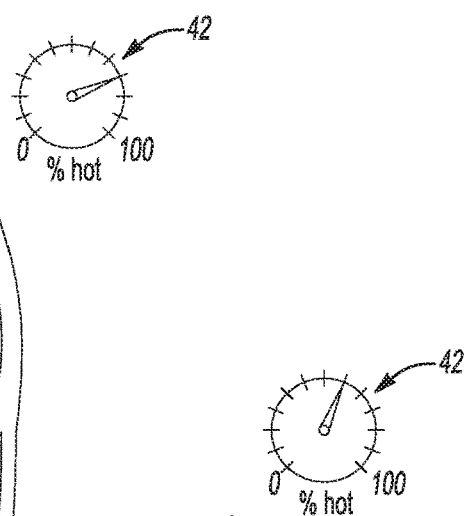
Figure 8E:
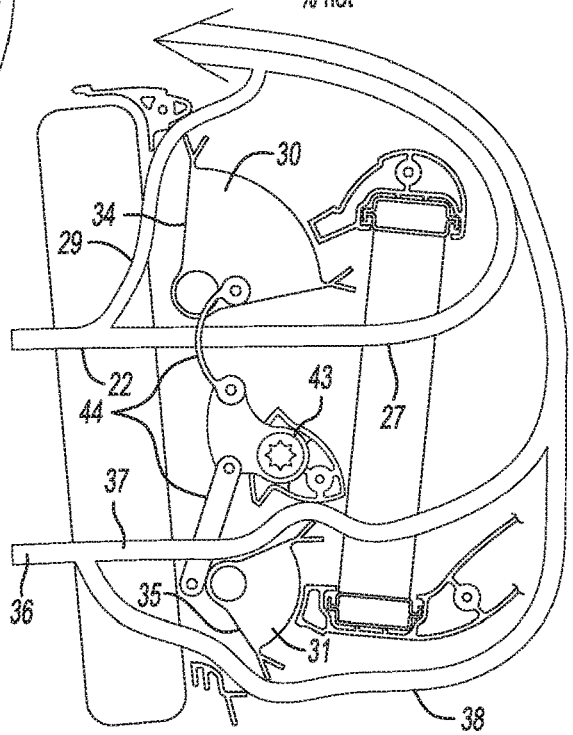
Figure 8F:
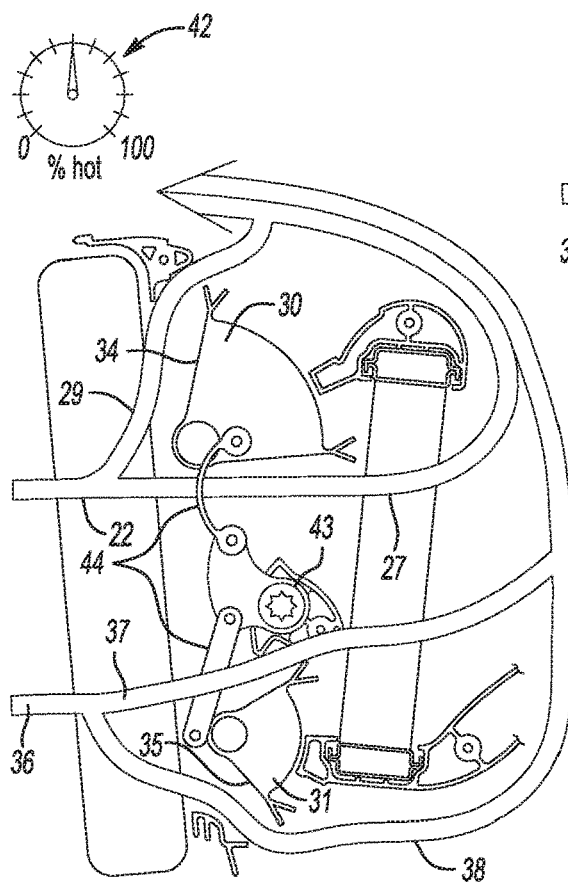
Figure 8G:
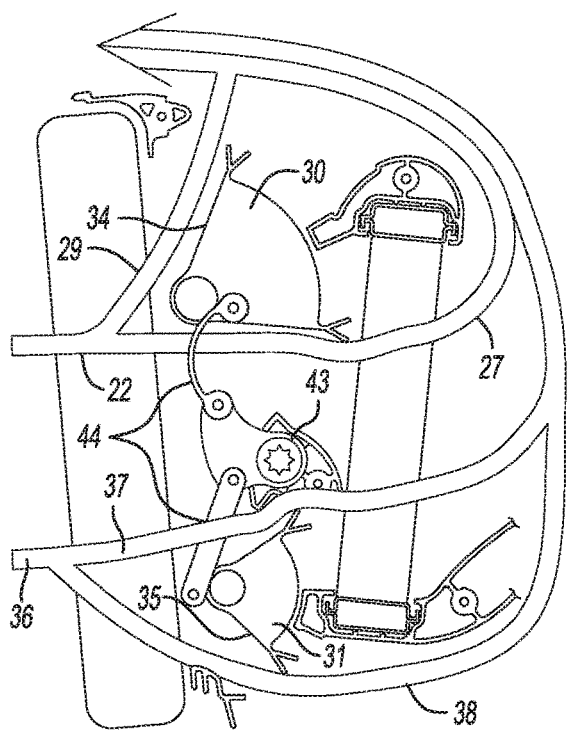
Figure 8H:
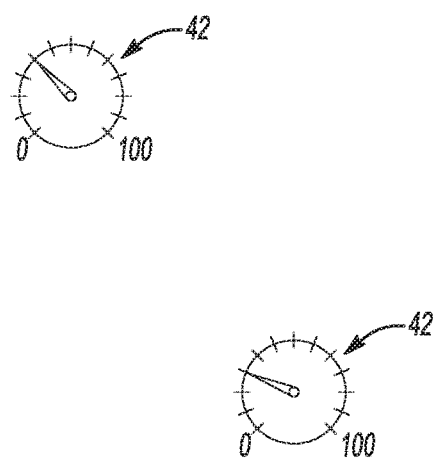
Figure 8H:
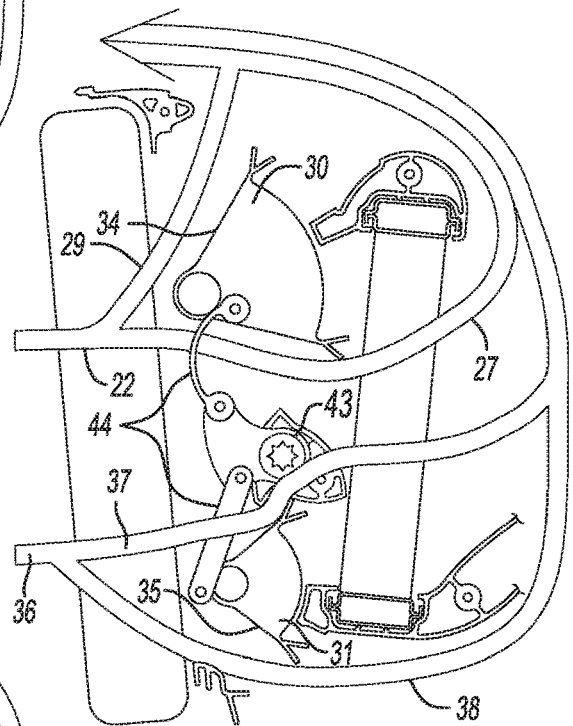
Figure 8I:
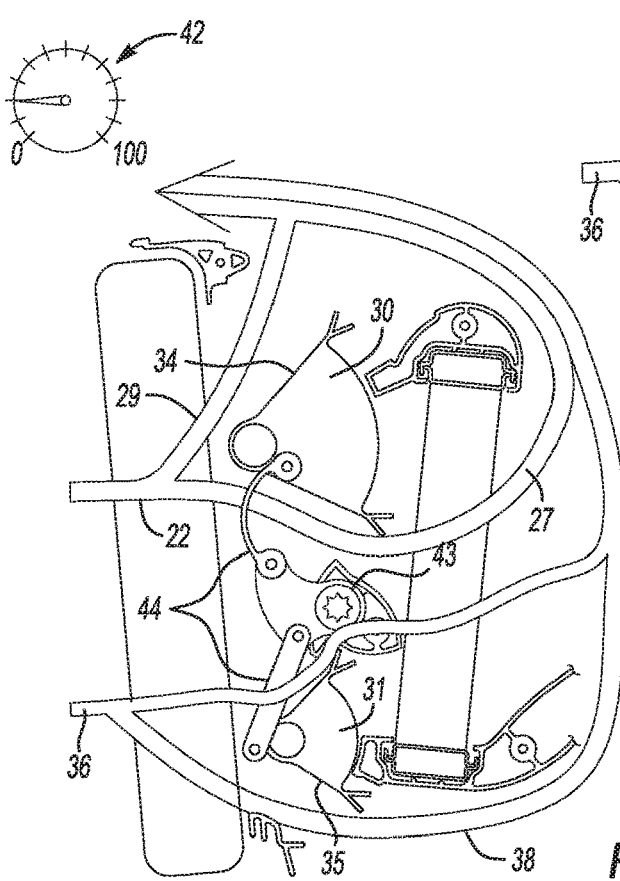
Figure 8J:
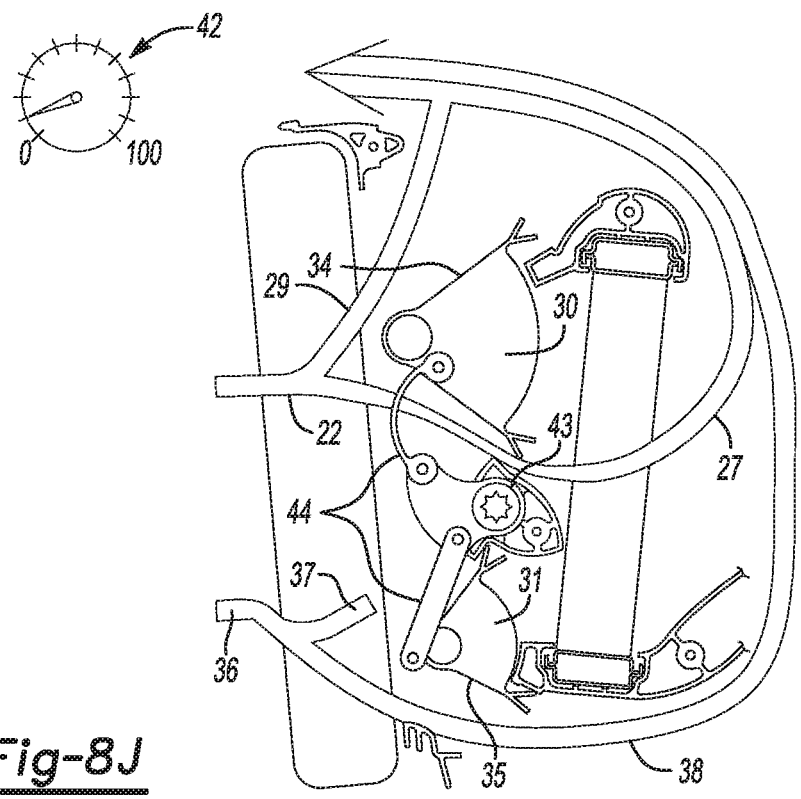
Figure 8K:
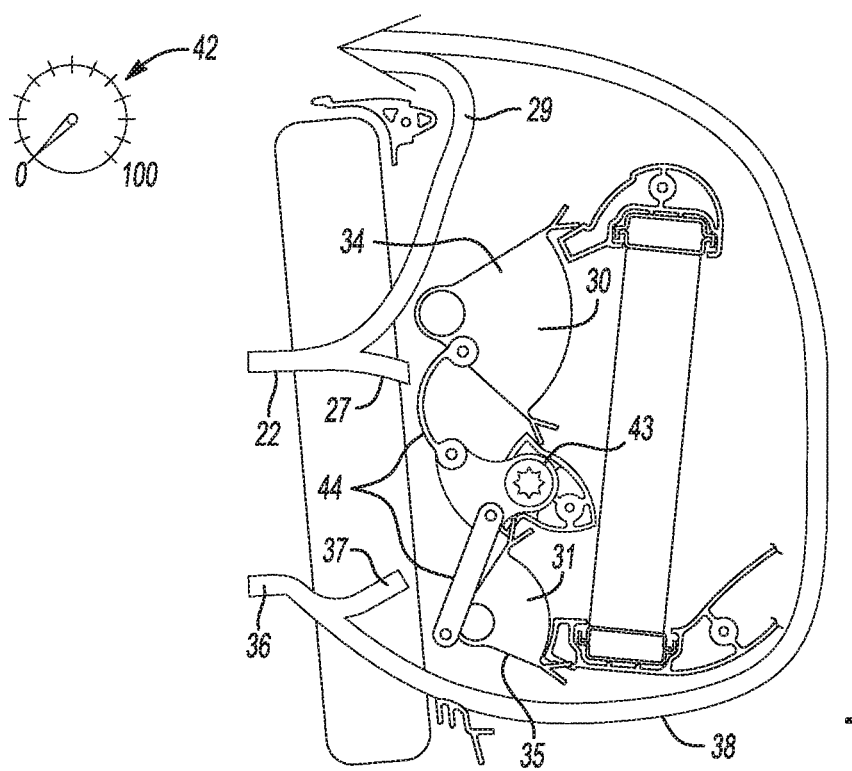

In an example, the upper blend setting 34 may remain at 100 percent upper hot, and the lower blend setting 35 may account for all of the cool air entering the upper blend zone 41 for all temperature setpoint settings between 100 percent module heat and about 82 percent module heat (FIGS. 8B and 8C). In other examples, the upper blend setting 34 may begin to open the upper cold branch 29 at about 90 percent module heat. A single actuator 43 may control rotation of the upper barrel door 30 and rotation of the lower barrel door 31 via kinematic links 44. Even though a single actuator 43 controls the respective rotations of both the upper barrel door 30 and the lower barrel door 31, the doors do not necessarily move equally. By beginning movement away from 100 percent hot with the smaller blend door (lower barrel door 31), fine control of the temperature may be achieved.

Figure 9:
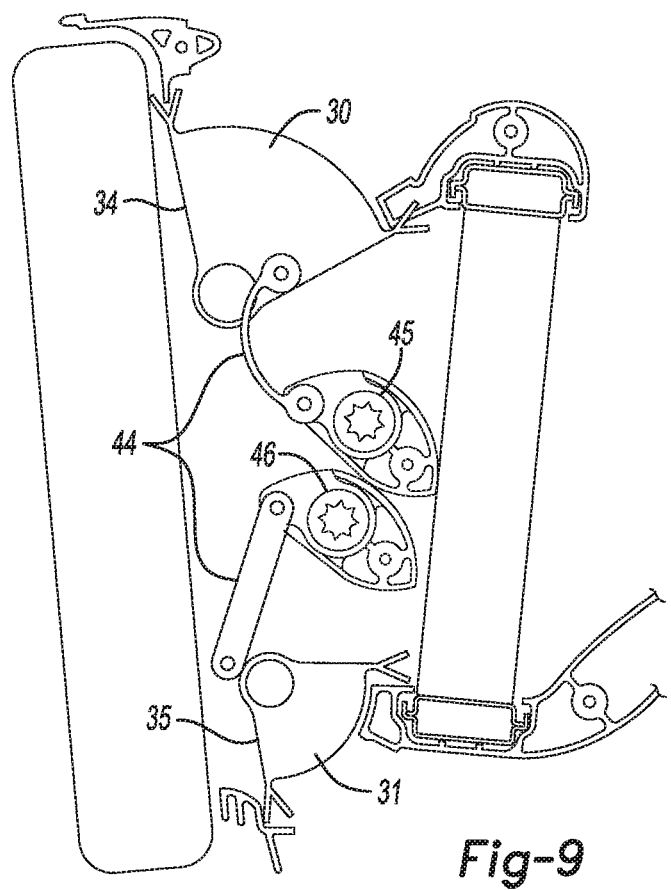
FIG. 9 is a semi-schematic cross-section view of an example of an HVAC module of the present disclosure with an upper actuator and a lower actuator.

FIG. 9 is a semi-schematic cross-section view of an example of an HVAC module of the present disclosure with an upper actuator 45 and a lower actuator 46. The upper actuator 45 controls rotation of the upper barrel door 30 and a lower actuator 46, distinct from the upper actuator 45, controls rotation of the lower barrel door 31.

Figure 10:
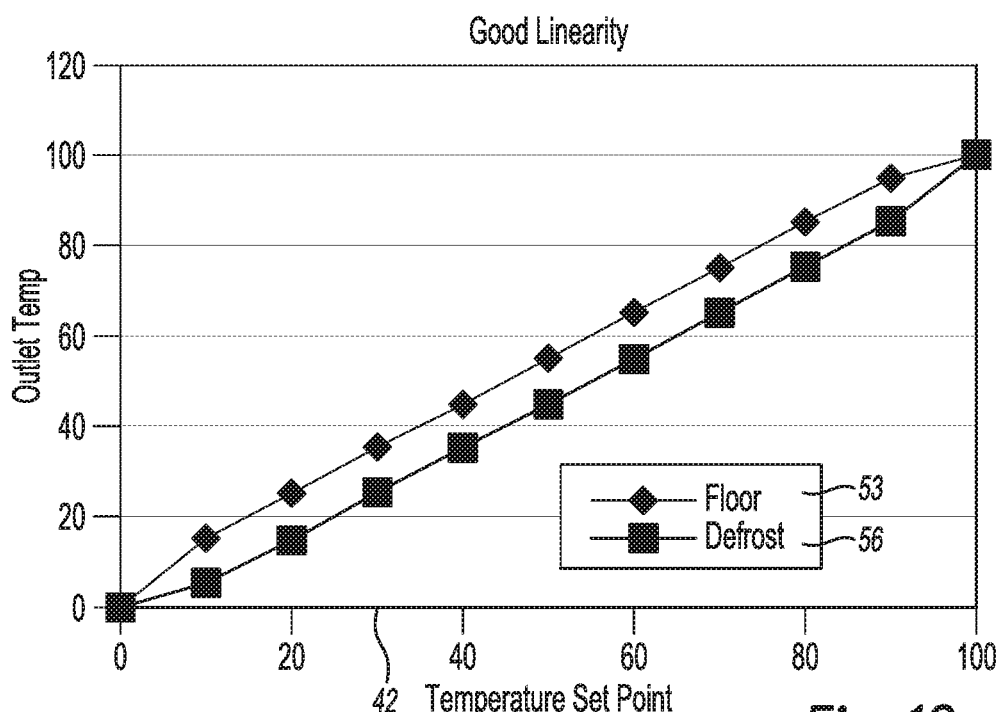
FIG. 10 is a graph depicting outlet temperature vs. temperature setpoint setting for an example of the present disclosure with relatively good linearity.

FIG. 10 is a graph depicting outlet temperature vs. blend setting for an example of the present disclosure with relatively good linearity. The temperature setpoint 42 is the blend setting. The temperature setpoint 42 is similar to the dial setting shown in FIGS. 8A-8K. FIG. 10 shows that the outlet temperature for defrost outlet 56 and the first row floor outlet 53 respond linearly to the blend setting/temperature setpoint 42. The linearity of FIG. 10 is in contrast to the non-linear temperature vs blend setting depicted in FIG. 11.

As shown in FIG. 11, when the upper barrel door 30 and the lower barrel door 31 are moved together, the temperature may change non-linearly. Non-linear temperature response is sometimes made more non-linear when restrictive walls are added to the cold air path; restrictive walls also increase acoustic noise and reduce airflow. Other types (i.e. not barrel doors as disclosed herein) and quantities of doors (i.e. not two doors as disclosed herein) may be used to improve linearity, however, such other linearity improvements require more space and still more restrictive walls. Non-linear temperature response could be manifested as follows: the heat is set to 100 percent hot during vehicle warm up; the passenger compartment of the vehicle reaches a temperature that is above a comfortable temperature; the control knob is nudged slightly off of full hot (e.g. 95 percent hot); the temperature drops well below a comfortable temperature; the control knob is set back to full hot, and the cycle repeats, with a steady, comfortable temperature being difficult to achieve using the control knob.

Figure 12:
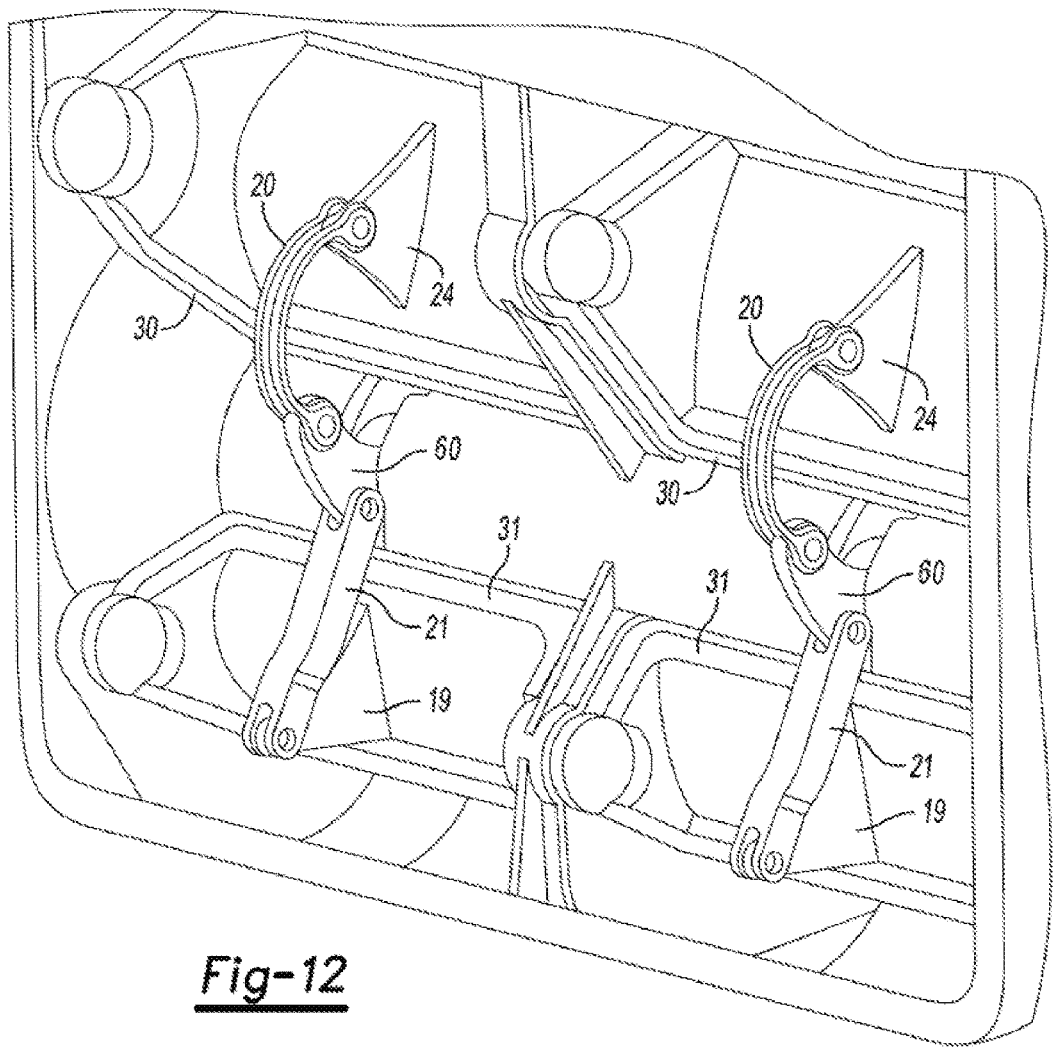
FIG. 12 is a semi-schematic interior view of an HVAC module depicting blend doors for a dual-zone climate control system.

FIG. 12 is a semi-schematic interior view of an HVAC module 14 depicting barrel doors 30, 31 for a dual-zone climate control system. A dual-zone climate control system may have two sets of temperature controls: one for the driver and one for the front passenger. Some vehicles have "tri-zone" or "quad-zone" climate control. These third and fourth zones may be for rear passengers. Examples of the present disclosure may be adapted to such multi-zone climate control systems by including an upper barrel door 30 and a lower barrel door 31 as blend doors for each zone of the multi-zone climate control system. As shown in FIG. 12, the left side controls the blend for a first climate control zone, and the right side controls the blend for a second climate control zone. Each zone has an actuator arm 60 connected to a rotary actuator. A flexible kinematic link 20 connects the actuator arm 60 to an upper door lever 24 to rotate the upper barrel door 30. A rigid kinematic link 21 connects the actuator arm 60 to the lower door lever 19 to rotate the lower barrel door 31.

Examples of the present disclosure may include the flexible kinematic link 20 to allow a single actuator 43 to control the upper barrel door 30 and lower barrel door 31. The flexible kinematic links are flexible in a single plane, such that the upper barrel door 30 that is driven by that flexible kinematic link 20 can achieve a seal with the housing prior to the lower barrel door 31. The actuator continues motion to seal the lower barrel door 31; the flexible kinematic link 20 compresses or stretches to prevent over-compression of the seal of the upper barrel door 30, and to prevent high forces on the other elements in the kinematic linkage chain. When the actuator moves in the opposite direction, the flexible kinematic link 20 can again allow the upper barrel door 30 to achieve a seal prior to the lower barrel door 31; and again flex to avoid high forces to the other elements of the kinematic linkage chain while the lower barrel door 31 continues motion to achieve a seal.

Figure 13:
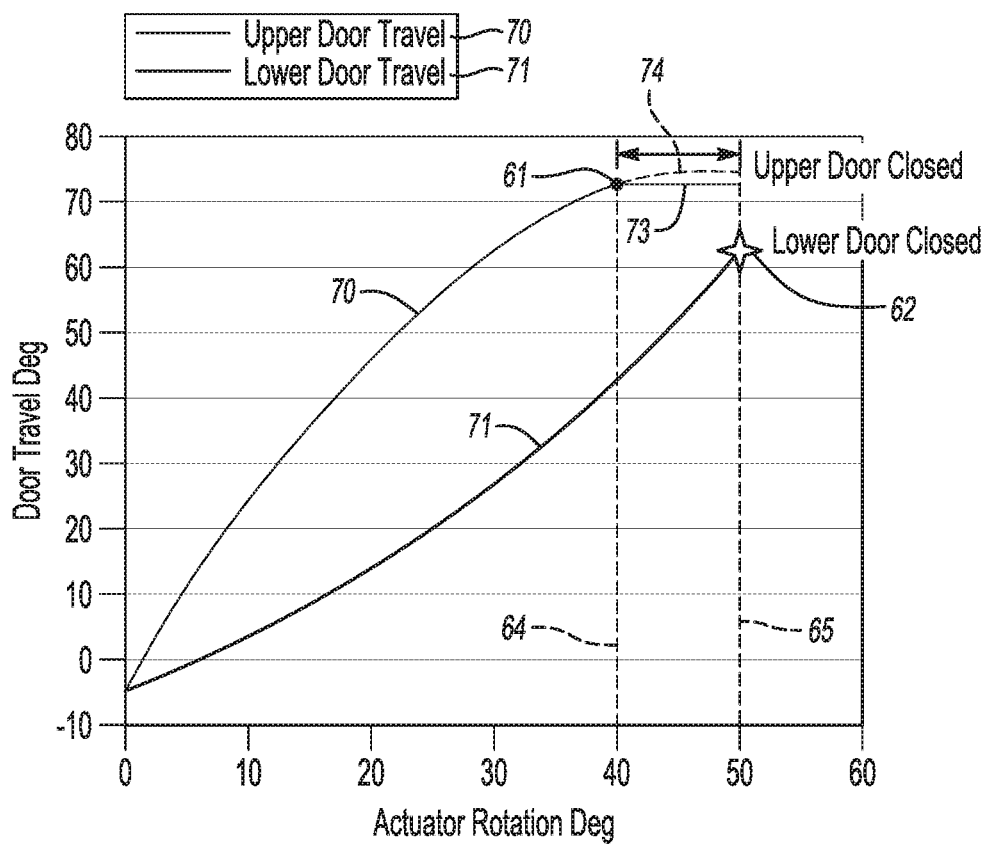
FIG. 13 is a graph depicting blend door travel vs. actuator rotation for an example of the present disclosure.

FIG. 13 is a graph depicting blend door travel vs. actuator rotation for an example of the present disclosure. The upper door travel 70 of the upper barrel door 30 is depicted by the upper curve in FIG. 13. The lower door travel 71 of the lower barrel door 31 is depicted by the lower curve in FIG. 13. The kinematic arrangements cause the upper barrel door 30 and the lower barrel door 31 to travel different angles even though the doors are driven by the same actuator. The vertical line 64 is constructed at the actuator rotation angle that corresponds to the upper barrel door 30 being in an upper door closed position 61. In other words, the upper barrel door 30 is closed when the actuator rotation angle is about 40 degrees in FIG. 13. The horizontal line 73 beginning at 61 between vertical line 64 and vertical line 65 in FIG. 13 indicates that the upper barrel door 30 does not continue to rotate even though the actuator continues to rotate from about 40 degrees to about 50 degrees. The arcuate line 74 beginning at 61 between vertical line 64 and vertical line 65 in FIG. 13 indicates the travel that the upper barrel door 30 would have if the flexible kinematic link 20 were replaced by a rigid link. The distance between arcuate line 74 and horizontal line 73 indicates an amount of over compression of the seals on the upper barrel door 30 that is prevented by the flexing of the flexible kinematic link 20. At an actuator rotation angle of about 50 degrees, the lower barrel door 31 is closed as shown at reference numeral 62. The sequencing of closure of the upper barrel door 30 and the lower barrel door 31 as disclosed herein improves linearity of outlet temperature vs. temperature set point as shown in FIG. 10.

Figure 14:
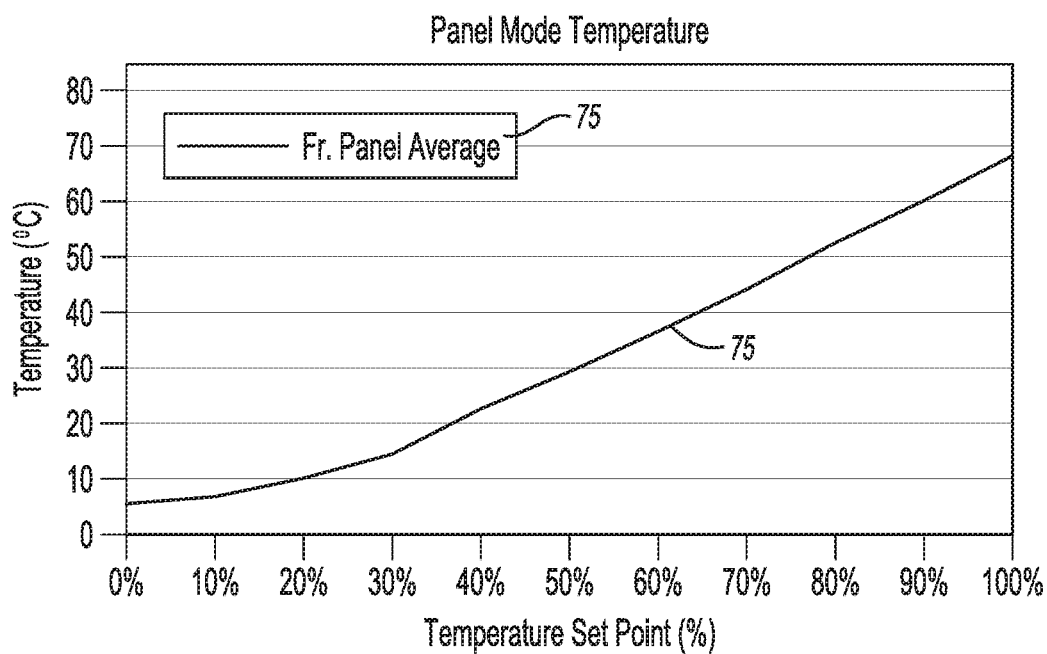
FIG. 14 is a graph depicting outlet temperature vs. temperature setpoint test results for an example of the HVAC module of the present disclosure in a panel mode.

FIG. 14 is a graph depicting outlet temperature vs. temperature setpoint test results for an example of the HVAC module of the present disclosure in a panel mode. In the panel mode, all of the air output by the HVAC module is directed through first and second row panel outlets. Although panel mode is typical for air conditioning, panel mode may be used with heat. The temperature trace 75 in FIG. 14 is the average of the temperatures of all of the first row panel outlets.

Figure 15:
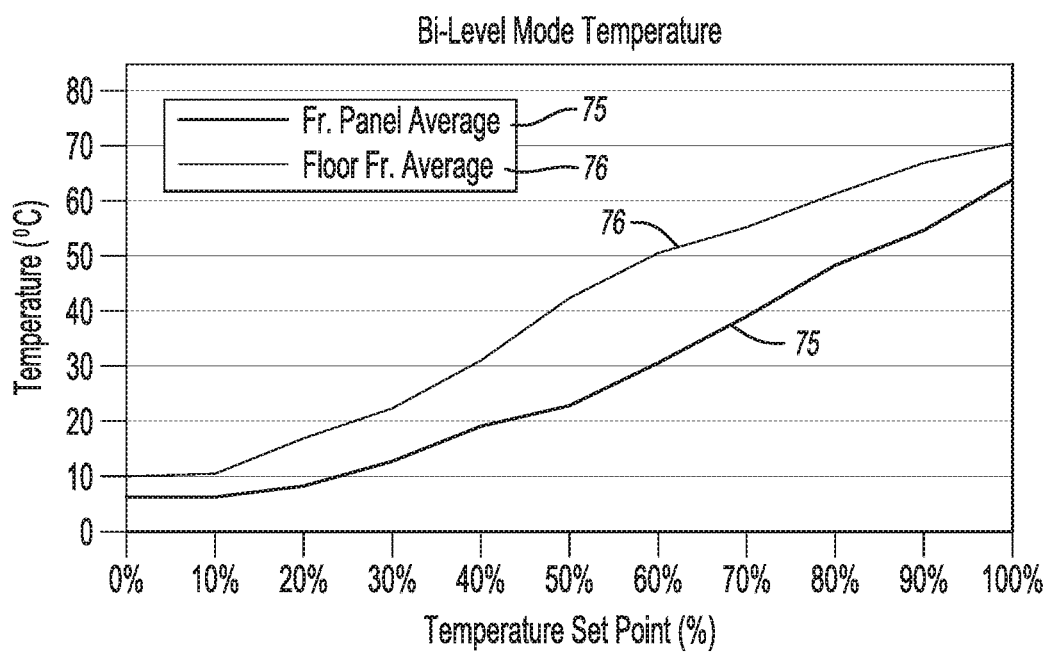
FIG. 15 is a graph depicting outlet temperature vs. temperature setpoint test results for the example of the HVAC module tested in FIG. 14 with the HVAC module in a bi-level mode.

FIG. 15 is a graph depicting outlet temperature vs. temperature setpoint test results for the example of the HVAC module tested in FIG. 14 with the HVAC module in a bi-level mode. In the bi-level mode, of the air output by the HVAC module is directed through first and second row panel outlets and the first and second row floor outlet(s). Temperature trace 75 in FIG. 15 is the average of the temperatures of all of the first row panel outlets. It is to be understood that all panel outlet temperatures are about the same temperature. Temperature trace 76 in FIG. 15 is the average of the temperatures of all of the first row floor outlets. All outlet temperatures of the floor outlets are about the same temperature.

Figure 16:
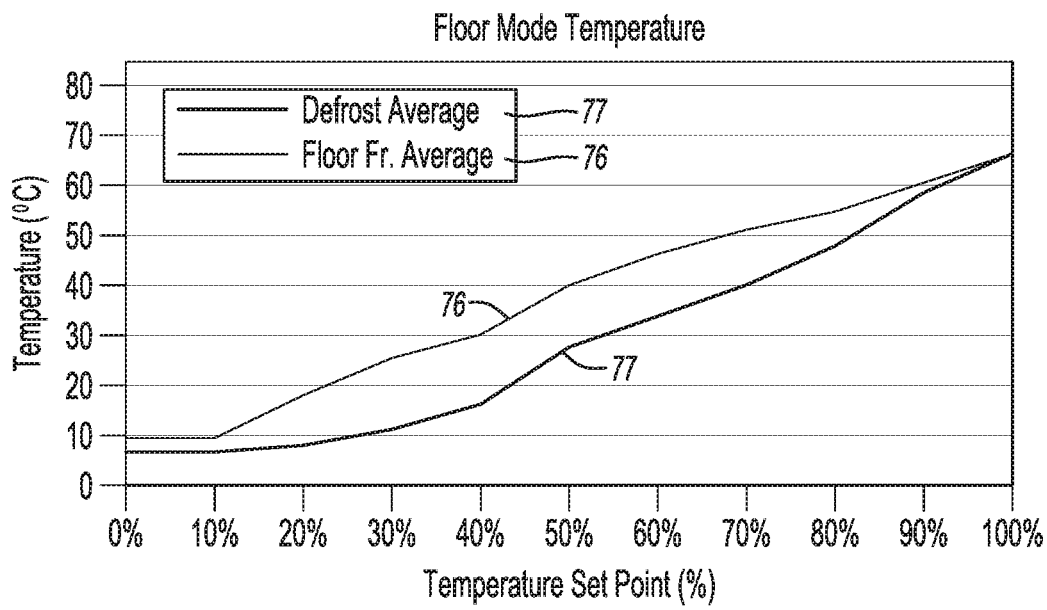
FIG. 16 is a graph depicting outlet temperature vs. temperature setpoint test results for the example of the HVAC module tested in FIG. 14 with the HVAC module in a floor mode.

FIG. 16 is a graph depicting outlet temperature vs. temperature setpoint test results for the example of the HVAC module tested in FIG. 14 with the HVAC module in a floor mode. In some vehicles, a small amount of airflow is directed to defrost in the floor mode. In the floor mode, all of the air output by the HVAC module is directed through the floor outlet(s) and the defrost outlets. Although the floor mode is typically for heating, the floor mode may be used with any temperature setpoint. Temperature trace 76 in FIG. 16 is the average of the temperatures of all of the first row floor outlets. It is to be understood that all first row floor outlet temperatures are about the same temperature. Temperature trace 77 in FIG. 16 is the average of the temperatures of the defrost outlets. All defrost outlet temperatures are about the same temperature.

Figure 17:
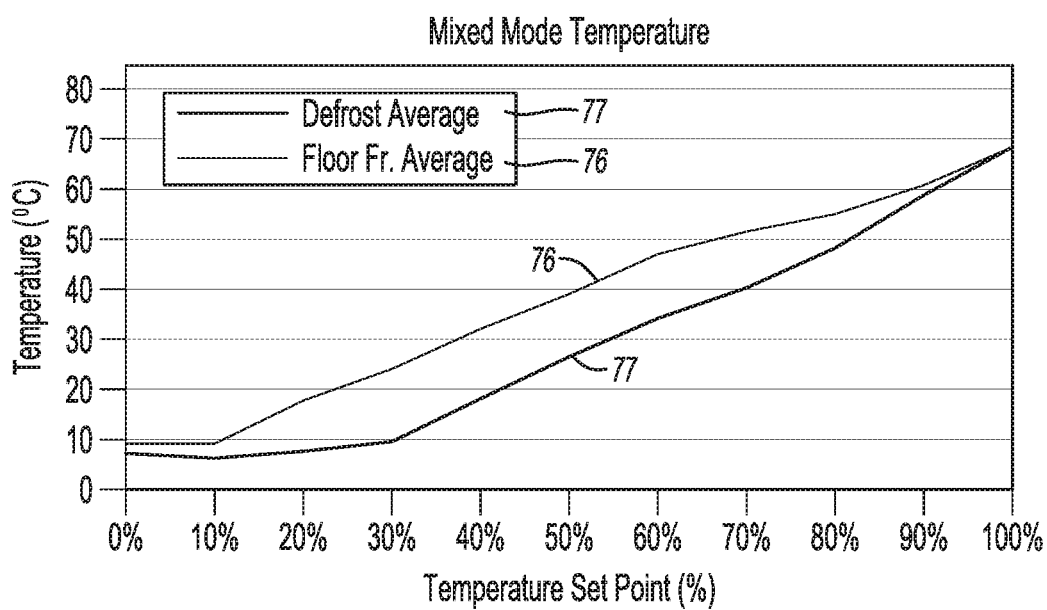
FIG. 17 is a graph depicting outlet temperature vs. temperature setpoint test results for the example of the HVAC module tested in FIG. 14 with the HVAC module in a mix mode.

FIG. 17 is a graph depicting outlet temperature vs. temperature setpoint test results for the example of the HVAC module tested in FIG. 14 with the HVAC module in a mix mode. In the mix mode, the air output by the HVAC module is directed through the floor outlet(s) and the defrost outlets. Although the mix mode is typical for heating, the mix mode may be used with any temperature setpoint. Temperature trace 76 in FIG. 17 is the average of the temperatures of all of the first row floor outlets. All of the first row floor outlet temperatures are about the same temperature. Temperature trace 77 in FIG. 17 is the average of the temperatures of the defrost outlets. All defrost outlet temperatures are about the same temperature.

Figure 18:
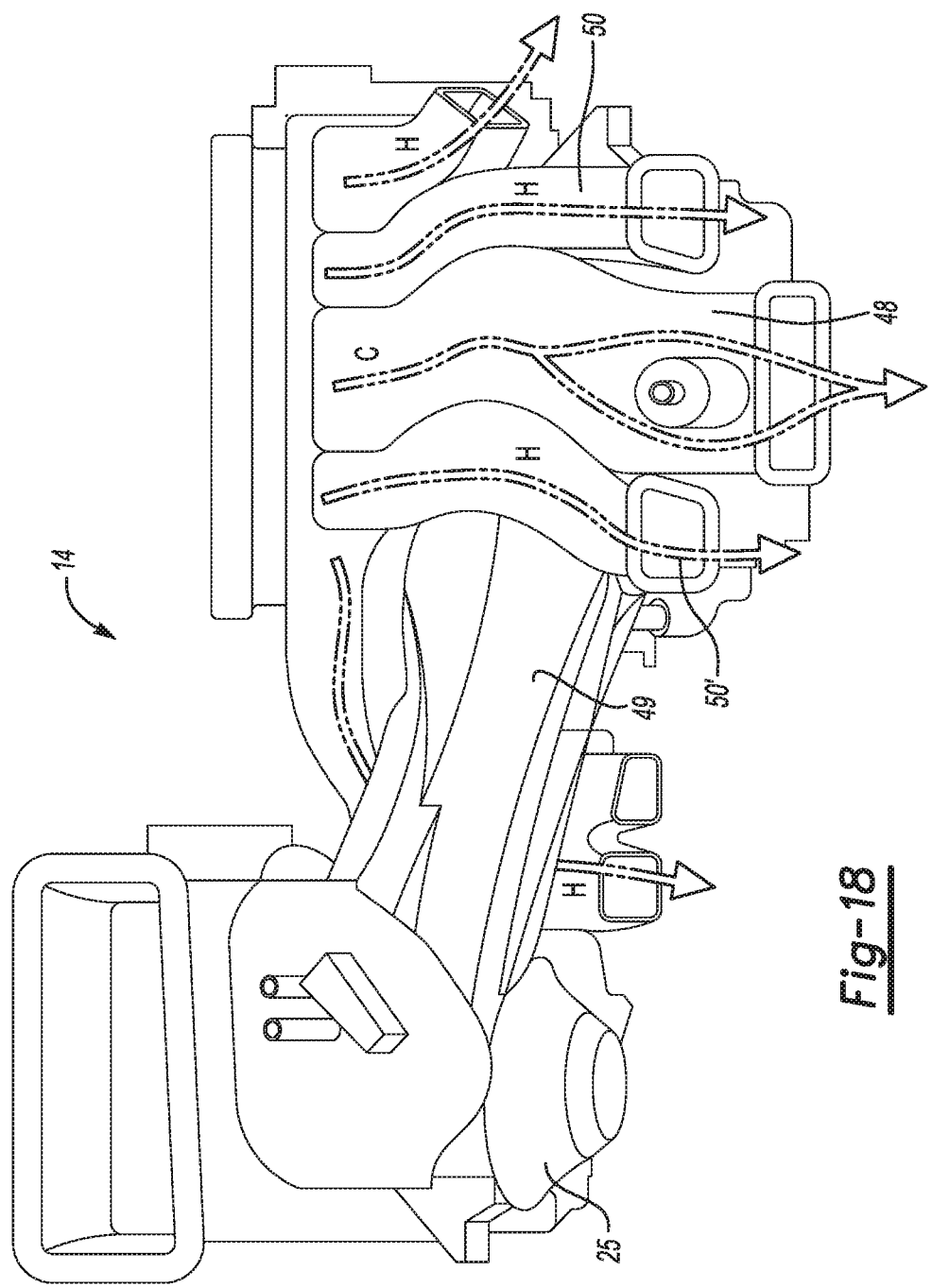
FIG. 18 is a semi-schematic front perspective view of an example of an HVAC module with ducts for directing airflow to a second row of seating in a vehicle passenger compartment according to the present disclosure.

FIG. 18 is a semi-schematic front view of an example of an HVAC module 14 with ducts for directing airflow to a second row of seating in a vehicle passenger compartment. Examples of the present disclosure advantageously and efficiently use space forward of the evaporator feed duct for supplying air to a second row vent duct 48 and a second row floor duct 50. As depicted in FIG. 5B, FIG. 7 and FIG. 18, examples of the present disclosure may include a second row vent duct 48 routed from the upper blend zone 41 down and forward of an evaporator feed duct 49. Second row floor ducts 50, 50' may be routed from the upper blend zone 41 down and forward of the evaporator feed duct 49.

While reference is made herein to an upper door, upper airflow path, lower door, and lower airflow path, etc., it is to be understood that elements of the system may be rotated in the vehicle. For example, the upper door may be a left door, and the lower door may be a right door, the upper airflow path may be a left airflow path, and the lower airflow path may be a right airflow path, etc.

It is to be understood that the ranges provided herein include the stated range and any value or sub-range within the stated range. For example, a range of from about 40 degrees to about 50 degrees should be interpreted to include not only the explicitly recited limits of about 40 degrees to about 50 degrees, but also to include individual values, such as 42 degrees, 46.5 degrees, etc., and sub-ranges, such as from about 44 degrees to 48 degrees, etc. Furthermore, when "about" is utilized to describe a value, this is meant to encompass minor variations (up to +/−10%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

The terms "connect/connected/connection" and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "connected to" the other component is somehow in communication with the other component (notwithstanding the presence of one or more additional components therebetween). Additionally, two components may be permanently, semi-permanently, or releasably engaged with and/or connected to one another.

It is to be further understood that "communication" is to be construed to include all forms of communication, including direct and indirect communication. Indirect communication may include communication between two components with additional component(s) located therebetween.

While several examples have been described in detail, it is to be understood that the disclosed examples may be modified. Therefore, the foregoing description is to be considered non-limiting.

What is claimed is:

1. An HVAC module for a vehicle, comprising:
    an upper airflow from an evaporator having an upper hot branch through a heater core and an upper cold branch that bypasses the heater core;
    a lower airflow from the evaporator having a lower hot branch through the heater core and a lower cold branch that bypasses the heater core;
    an upper barrel door to select an upper blend setting of the upper airflow directed through the upper hot branch and the upper airflow directed through the upper cold branch;
    a lower barrel door to select a lower blend setting of the lower airflow directed through the lower hot branch and the lower airflow directed through the lower cold branch;
    an actuator arm connected to a single rotary actuator, the actuator arm rotatable by the single rotary actuator;
    an upper door lever to rotate the upper barrel door;
    a lower door lever to rotate the lower barrel door;
    a flexible kinematic link disposed between the actuator arm and the upper door lever, the actuator arm linked to the upper door lever by the flexible kinematic link; and
    a rigid kinematic link disposed between the actuator arm and the lower door lever, the actuator arm linked to the lower door lever by the rigid kinematic link;
    wherein the single rotary actuator controls rotation of the upper barrel door via the actuator arm, through the flexible kinematic link to the upper door lever;
    wherein the single rotary actuator controls rotation of the lower barrel door via the actuator arm, through the rigid kinematic link to the lower door lever;
    wherein the upper hot branch and the lower hot branch are connected to a rear duct connected to an upper blend zone;
    wherein the upper barrel door and the lower barrel door are each barrel doors, each having an outer surface in a shape of a slice of a respective hollow cylinder closed on both ends;
    wherein the upper barrel door and the lower barrel door rotate about a respective axis at a respective center of the respective hollow cylinder;
    wherein the upper cold branch feeds into the upper blend zone; and
    wherein the lower cold branch feeds into the rear duct.

2. The HVAC module as defined in claim 1 wherein an upper airflow path for the upper airflow is less restrictive than a lower airflow path for the lower airflow.

3. The HVAC module as defined in claim 2 wherein a first barrel radius of the upper barrel door is larger than a second barrel radius of the lower barrel door.

4. The HVAC module as defined in claim 2 wherein:
    a first barrel radius of the upper barrel door is equal to a second barrel radius of the lower barrel door; and
    the lower barrel door is narrower in a left-right vehicle direction than the upper barrel door.

5. The HVAC module as defined in claim 3 wherein the HVAC module has a temperature setpoint with a range of settings from 0 percent module heat to 100 percent module heat.

6. The HVAC module as defined in claim 5 wherein:
    the upper blend setting ranges from 100 percent upper cold to 100 percent upper hot;
    100 percent upper cold corresponds to 100 percent of the upper airflow flowing in the upper cold branch and zero percent of the upper airflow flowing in the upper hot branch;
    100 percent upper hot corresponds to zero percent of the upper airflow flowing in the upper cold branch and 100 percent of the upper airflow flowing in the upper hot branch;
    100 percent of the upper airflow is divided between the upper cold branch and the upper hot branch by the upper barrel door;
    the lower blend setting ranges from 100 percent lower cold to 100 percent lower hot;
    100 percent lower cold corresponds to 100 percent of the lower airflow flowing in the lower cold branch and zero percent of the lower airflow flowing in the lower hot branch;
    100 percent lower hot corresponds to zero percent of the lower airflow flowing in the lower cold branch and 100 percent of the lower airflow flowing in the lower hot branch; and
    100 percent of the lower airflow is divided between the lower cold branch and the lower hot branch by the lower barrel door.

7. The HVAC module as defined in claim 6 wherein the upper blend setting remains at 100 percent upper hot, and the lower blend setting accounts for all cool air entering the upper blend zone for all temperature setpoint settings between 100 percent module heat and 90 percent module heat.

8. The HVAC module as defined in claim 1 wherein the lower cold branch passes under the heater core.

9. The HVAC module as defined in claim 1 wherein the lower cold branch passes left or right of the heater core wherein left and right refer respectively to negative and positive Y directions in a vehicle coordinate system.

10. The HVAC module as defined in claim 1 wherein:
   the upper airflow is about 65 percent of a total airflow through the evaporator; and
   the lower airflow is about 35 percent of the total airflow through the evaporator.

11. The HVAC module as defined in claim 1 wherein a second row vent duct is routed to direct airflow in the second row vent duct from the upper blend zone down and forward of an evaporator feed duct.

12. The HVAC module as defined in claim 11 wherein a second row floor duct is routed to direct airflow in the second row floor duct from the upper blend zone down and forward of the evaporator feed duct.

13. The HVAC module as defined in claim 1 wherein the evaporator is to provide cold air and the heater core is to provide hot air.

* * * * *